United States Patent
Shaikh et al.

(10) Patent No.: US 8,036,126 B2
(45) Date of Patent: Oct. 11, 2011

(54) SYSTEM AND METHOD FOR COMPRESSING INTERNET PROTOCOL ROUTING TABLES

(75) Inventors: Aman Shaikh, Summit, NJ (US); Jacobus Van der Merwe, New Providence, NJ (US); Elliot Karpilovsky, Lawrenceville, NJ (US); Jennifer Lynn Rexford, Princeton, NJ (US); Matthew Caeser, Buffalo Grove, NJ (US)

(73) Assignee: AT&T Intellectual Property LLP, Reno, NV (US)

( * ) Notice: Subject to any disclaimer, the term of this patent is extended or adjusted under 35 U.S.C. 154(b) by 86 days.

(21) Appl. No.: 12/378,511

(22) Filed: Feb. 17, 2009

(65) Prior Publication Data

US 2010/0208744 A1    Aug. 19, 2010

(51) Int. Cl.
*G01R 31/08* (2006.01)
*H04L 12/28* (2006.01)

(52) U.S. Cl. .......................... 370/235; 370/351
(58) Field of Classification Search .................. None
See application file for complete search history.

(56) References Cited

U.S. PATENT DOCUMENTS

| 6,067,574 A | 5/2000 | Tzeng |
| 6,385,649 B1 | 5/2002 | Draves et al. |
| 6,581,106 B1 | 6/2003 | Crescenzi et al. |
| 2005/0147038 A1* | 7/2005 | Chandra et al. ............. 370/235 |
| 2008/0101372 A1* | 5/2008 | Brown et al. ................. 370/392 |
| 2009/0003367 A1* | 1/2009 | Hei et al. ...................... 370/408 |
| 2009/0182896 A1* | 7/2009 | Patterson et al. ............. 709/241 |

OTHER PUBLICATIONS

"Constructing Optimal IP Routing Tables," Richard P. Draves et al., Microsoft Research, IEEE, INFOCOM Proceedings, New York, Mar. 1999, pp. 1-25.
"Design and Implementation of a Routing Control Platform," Matthew Caesar et al., AT&T, Inc. pp. 1-14, 2005.
"The Case for Separating Routing from Routers," Nick Feamster et al., 2004.

\* cited by examiner

*Primary Examiner* — Daniel J Ryman
*Assistant Examiner* — John Blanton
(74) *Attorney, Agent, or Firm* — Larson Newman, LLP

(57) ABSTRACT

A networking device connects to a router and to an autonomous system (AS). The networking device receives a routing table from the router, exchanges routing information with the AS, updates the routing table in response to exchanging information with the AS, coalesces the updated routing table into a compressed routing table, and sends the compressed routing table back to the router. The compressed routing table causes the router to forward data in a manner that is identical to the received routing table.

14 Claims, 4 Drawing Sheets

SYSTEM AND METHOD FOR COMPRESSING INTERNET PROTOCOL ROUTING TABLES

FIELD OF THE DISCLOSURE

The present disclosure generally relates to communication networks, and more particularly relates to routing data packets in a communication network.

REFERENCE

The present disclosure includes a computer program listing appendix on a single compact disk, the contents of which are herein incorporated by reference. The compact disk includes a 24 KB file entitled "incr_ortc.py" which was created on Dec. 5, 2008. The computer program listing appendix is herein incorporated by reference. Duplicate copies of the computer program listing appendix are provided as "Copy 1" and "Copy 2". Copy 1 and Copy 2 are identical. The computer program listing reproduced in this disclosure contains material subject to copyright protection. The copyright owner of that material has no objection to the facsimile reproduction of the patent document or the patent disclosure, as it appears in the Patent and Trademark Office patent files or records, but otherwise reserves all copyright rights whatsoever.

BACKGROUND

The Internet has become a primary communication channel for the world, as it continues to grow in traffic volumes and reach. The types of applications supported over the Internet are also changing, from basic applications such as web browsing to applications with real-time constraints such as Internet Protocol (IP) telephony. As traffic volumes grow, network providers must maintain sufficient capacity for the existing traffic and plan for the growth in traffic volumes. By more efficiently utilizing existing resources within a network, network providers can delay the need to replace network hardware.

A router is a specialized computing device for routing and forwarding data packets over a network. A router includes a routing information base (RIB) that stores the set of routes advertised from neighboring routers, and a forwarding information base (FIB) that maps incoming packets to outgoing links. The RIB includes attributes and reachability information for hundreds of thousands of prefixes, including information about each neighboring router's forwarding capabilities. A router maintains the RIB by exchanging information with neighboring routers, and updates the FIB based upon the new information.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
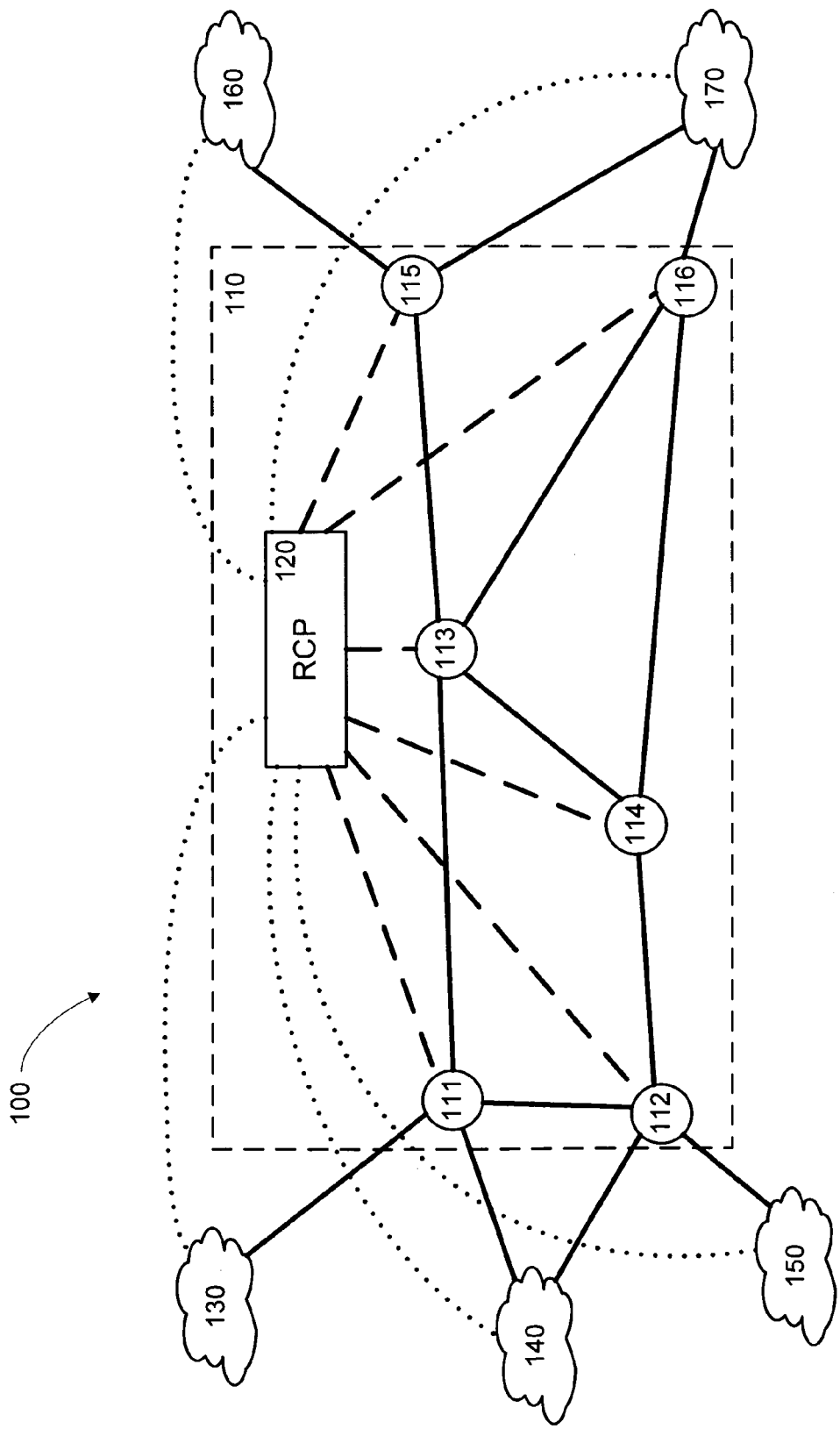
FIG. 1 is an illustration of an embodiment of a communications network according to the present disclosure.

FIG. 1 illustrates a communications network 100, including a network 110 that is coupled to external autonomous systems (AS's) 130, 140, 150, 160, and 170. Network 110 includes routers 111, 112, 113, 114, 115, and 116, and a routing control platform (RCP) 120. Routers 111-116 are connected to each other and to ASes 130-170 via physical peering links that permit the routing and forwarding of data between the interconnected elements. Thus router 111 is connected to routers 112 and 113 and to AS's 130 and 140, router 112 is connected to router 114 and to AS's 140 and 150, router 113 is connected to routers 114, 115, and 116, router 114 is connected to router 116, router 115 is connected to AS's 160 and 170, and router 116 is connected to AS 170. Because routers 111, 112, 115, and 116 each include a link to one or more ASes 130-170, routers 111, 112, 115, and 116 are referred to as border routers. Routers 113 and 114 are referred to as internal routers because they only include links to another router, and not to ASes 130-170. AS's 130-170 may also be connected to each other via physical peering links (not illustrated). The physical peering links are illustrated as solid lines between routers and AS's, and may include T-carrier links such as DS5 lines operating at approximately 400 Megabits per second (Mbit/s) or another T rate, E-carrier links such as E5 lines operating at approximately 565 Mbit/s or another E rate, Ethernet links such as 10 GBASE-R fiber optic links operating at approximately 10 Gigabits per second (Gbit/s) or another Ethernet bit rate, another physical link standard, or any combination thereof.

RCP 120 may be similar to the routing control platform described in *The Case for Separating Routing from Routers*, Nick Feamster, et al., SIGCOMM'04 Workshops, Aug. 30-Sep. 3, 2004, Portland, Oreg., the disclosure of which is hereby incorporated by reference. RCP 120 is connected to each router 111-116 and to each ASes 130-170 via physical peering links that permit the exchange of routing and forwarding information between the interconnected elements. RCP 120 functions to maintain an accurate, up-to-date view of the topology of network 110 through exchange of internal gateway protocol (IGP) information and internal border gateway protocol (iBGP) information with routers 111-116, and to exchange external border gateway protocol (eBGP) information with AS's 130-170. The exchange of IGP and iBGP information is illustrated by dashed lines between RCP 120 and routers 111-116. The exchange of eBGP information is illustrated by dotted lines between RCP 120 and AS's 130-170. RCP 120 maintains an accurate, up-to-date view of the topology of network 110 through exchange of IGP information with routers 111-116. The IGP information can include distance-vector routing protocol information such as routing information protocol (RIP) information or interior gateway routing protocol (IGRP) information, link-state routing protocol information such as open shortest path first (OSPF) information or intermediate system to intermediate system (IS-IS) information, other distance-vector or link-state routing protocol information, information consistent with another routing protocol, or any combination thereof.

RCP 120 also maintains an accurate, up-to-date view of the topology of communication network 100 through exchange of eBGP information with AS's 130-170. RCP 120 accesses the route information learned from AS's 130-170 and the IGP information learned from routers 111-116, and determines the overall route selection for network 110 by creating an overall RIB for network 110. RCP 120 then computes a separate FIB for each of routers 111-116, and propagates the separate FIBs through exchange of iBGP information with routers 111-116. Thus RCP 120 relieves routers 111-116 of the functions of learning and propagating route information. Memory and processing resources in routers 111-116 that would otherwise be utilized in creating and managing individual RIBs and FIBs are freed up to route and forward data packets.

RCP 120 can compute the separate FIB for each router 111-116 such that the FIB in each of routers 111-116 is the same as if routers 111-116 were coupled in a full-mesh configuration. In this way, RCP 120 can enforce uniformity in routing behavior by ensuring that each router 111-116 along a particular forwarding path selects the same best BGP route for a given destination prefix, like in a full-mesh configuration, but without the scaling problems associated with the application of full-mesh configurations to large networks. In another embodiment, RCP 120 can provide flexibility in computing the FIB for each router 111-116. For example, RCP 120 can detect and suppress oscillations in routing behavior that would otherwise be caused by changes in IGP or eBGP conditions, such as when a link fails or the IGP cost of a particular route changes, and RCP 120 can ensure that each router 111-116 along a particular route continues to choose the same egress point for a given destination prefix. In another example, RCP 120 can intentionally change the egress point selected by each router 111-116 for a particular prefix in order to move traffic to a lightly loaded border router or to favor a less congested downstream path.

Although illustrated as a single element in network 110, the functionality of RCP 120 may be implemented using more than one separate component, each implementing a particular function of RCP 120. When implemented as more than one component, the separate components of RCP 120 do not need to be at the same location in network 110, but may be distributed to several locations in network 110. In a particular embodiment (not illustrated), the functionality of RCP 120 may be included in one or more of routers 111-116, wherein the one or more of routers 111-116 performs the functions of RCP 120 in addition to routing and forwarding data packets. In another embodiment (not illustrated), network 110 includes more than one RCP 120. In a particular aspect, a first RCP 120 can function as a master routing control platform, while the additional one or more RCPs 120 can function as back-up routing control platforms that provide redundancy and fault tolerance to network 110. In another aspect, network 110 can be partitioned into subnets and each of the more than one RCPs 120 can function as an independent routing control platform over a particular subnet.

In another embodiment, network 110 can be configured to handle a failure of RCP 120. In this embodiment, border routers 111, 112, 115, and 116 can maintain eBGP peering sessions with AS's 130-170. Such peering sessions can be maintained over the illustrated physical peering links that permit the routing and forwarding of data between the interconnected elements, or can be maintained over separate physical peering links (not illustrated). Here, border routers 111, 112, 115, and 116 can be configured to give routes learned from RPC 120 a higher local preference attribute (LocalPref) than routes learned from AS's 130-170. In this way, under normal circumstances, routers 111-116 will use routes learned from RPC 120 in favor of those learned from AS's 130-170. However, if RCP 120 fails, then border routers 111, 112, 115, and 116 can switch over to the routes learned from AS's 130-170.

Figure 2:
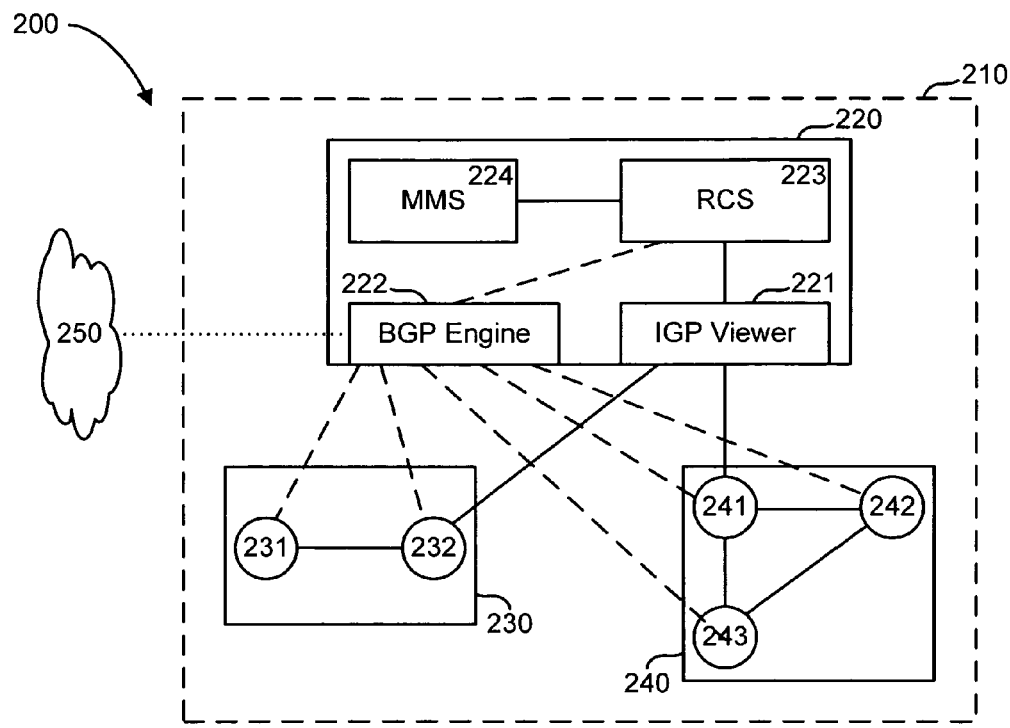
FIG. 2 is an illustration of another embodiment of a communications network, including a block diagram of a routing control platform according to the present disclosure.

FIG. 2 illustrates a communications network 200, including a network 210 that is coupled to an external AS 250. Network 210 includes an RCP 220 that is coupled to two network partitions (NPs) 230 and 240. RCP 220 includes an IGP viewer 221, a BGP engine 222, a route control server (RCS) 223, and a memory management system (MMS) 224. NP 230 includes routers 231 and 232. NP 240 includes routers 241, 242, and 243. RCP 220 functions similarly to RCP 120. IGP viewer 221 is connected to RCS 223, and to one or more router in NPs 230 and 240 via physical peering links, shown as solid lines, that permit the exchange of IGP information between the interconnected elements. BGP engine 222 is connected to RCS 223, and to routers 231, 232, 241, 242, and 243 via physical peering links, shown as dashed lines, that permit the exchange of iBGP information between the interconnected elements. BGP engine 222 is also connected to AS 250 via a physical peering link, shown as a dotted line, that permits the exchange of eBGP information. RCS 223 is also coupled to MMS 224 as described below. Routers 231 and 232 are connected together via a physical peering link that permits the exchange of IGP information. Routers 241, 242, and 243 are connected together via physical peering links that permit the exchange of IGP information. Routers 231, 232, 241, 242, and 243 can also be coupled together or to AS 250 via physical peering links (not shown) that permit the routing and forwarding of data packets.

IGP viewer 221 computes the shortest paths between router pairs among routers 231, 232, 241, 242, and 243, and provides the information to RCS 223. A particular network partition may use the same router en route to a particular prefix. For example, a network provider may have a group of access routers in a city, all of which send data packets out of that city towards one or more destinations via a single gateway router. The group of access routers can be formed according to the IGP topology, such as according to an OSPF area, because the routers in such an area will typically make the same routing decisions. Thus, because IGP viewer 221 knows the IGP topology, IGP viewer 221 can determine which routers 231, 232, 241, 242, or 243 should be assigned to the same gateway router. For example, IGP viewer 221 may evaluate the IGP information from network 210 and determine that NP 230 should use router 231 as a gateway to AS 250, and that NP 240 should use router 241 as a gateway to AS 250. In another embodiment, the gateway for a particular group of access routers can be dictated by the network provider. For example, IGP viewer 221 may direct that both NPs 230 and 240 should use router 231 as a gateway to AS 250. In either case, IGP viewer 221 can reduce the number of independent route computations that RCS 223 needs to perform.

BGP engine 222 maintains iBGP sessions with routers 231, 232, 341, 242, and 243 to communicate routing decisions to routers 231, 232, 341, 242, and 243, and maintains an eBGP session with AS 250 to learn about candidate routes and communicate routing decisions to AS 250. BGP engine 222 can send different route information to each of routers 231, 232, 341, 242, and 243, and can send updates to routers 231, 232, 341, 242, or 243 to modify the FIB. RCS 223 receives the IGP topology information from IGP viewer 221, and the eBGP and iBGP route information from BGP engine 222. RCS 223 compiles this information into a RIB for network 210, and computes separate FIBs for routers 231, 232, 341, 242, and 243. In one embodiment, RCS 223 can assign routes in the separate FIBs in the same manner that routers 231, 232, 341, 242, and 243 would assign for themselves if they were connected in a full-mesh configuration.

Network 210 and AS 250 often advertise multiple subnets in the same address block to balance the flow of traffic over several incoming links. This can lead to larger RIBs and FIBs within routers 231, 232, 241, 242, and 243, and to more frequent and larger BGP updates between routers 231, 232, 241, 242, and 243. While a particular router, for example router 231, can aggregate the multiple subnets into a single entry in the FIB, aggregating subnets with the same next-hop is preferably not done indiscriminately, because the other routers 232, 241, 242, and 243 may need to treat the subnets differently. Instead, MMS 224 can coalesce routing table entries by aggregating redundant route information. For example, if RCP 220 determines that the routes for 12.1.2.0/24 and 12.1.3.0/24 in router 232 have the same next-hop, then MMS 224 can condense the routes to a single route 12.1.2.0/23 that RCP 220 sends to router 232. In this way, MMS 224 can further reduce the memory needed to store the FIB in routers 231, 232, 241, 242, and 243.

In a particular embodiment, MMS 224 can perform route aggregation using an optimal route table constructor (ORTC) algorithm, as described in *Constructing Optimal IP Routing Tables*, Richard P. Draves, et al., Technical Report MSR-TR-98-59, November 1998, Microsoft Research, Redmond, Wash., the disclosure of which is hereby incorporated by reference. The RIB and FIBs, described hereinafter collectively as the routing tables, include a set of IP address prefixes and a next-hop associated with each prefix. When a data packet arrives at a router, the destination IP address of the packet is looked up in the FIB, the longest matching prefix is found, and the data packet is sent to the associated next-hop output link. MMS 224 includes a copy of each of routers' 231, 232, 241, 242, and 243 routing tables, and operates on the routing tables using the ORTC algorithm to construct equivalent routing tables with a smaller number of prefixes. MMS 224 uses three passes over the routing table to optimize the routing table, as described below.

Figure 3:
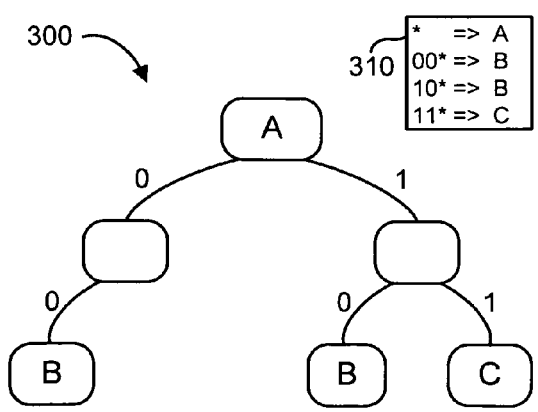
FIG. 3 is a binary tree representing a routing table.

FIG. 3 illustrates a binary tree 300 representing a routing table 310. Each successive bit in a prefix corresponds to a link to a child node in the tree, with a "0" corresponding to the left child, and a "1" corresponding to the right child. Each node is labeled with the next-hop associated with the associated prefix. As illustrated, routing table 310 has a default next hop to "A," IP addresses with the prefixes 00* and 10* have a next-hop to "B," and IP addresses with the prefixes 11* have a next-hop to "C." Routing table 310 is thus shown to have four entries.

Figure 4:
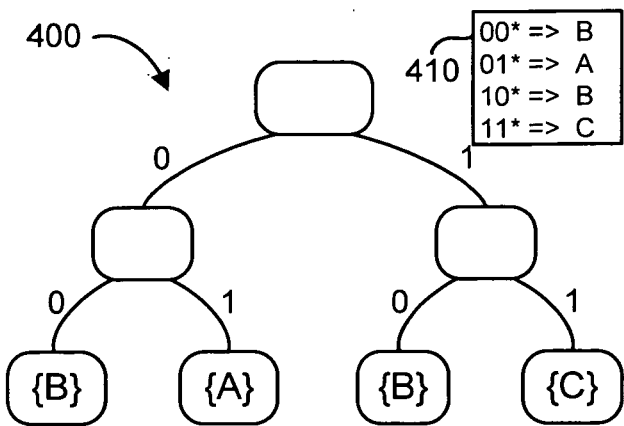
FIG. 4 is the binary tree of FIG. 1 after a first processing pass by an embodiment of a memory management system.

In the first pass over the routing table, MMS 224 normalizes the binary tree such that each node has either zero or two children. This is done by first creating new leaf nodes and then initializing the next-hop for the new nodes with the next-hop inherited from its nearest ancestor that has a next hop. The next-hop for each prefix is converted into a singleton set, or a set with exactly one element. FIG. 4 illustrates the binary tree 400 that results after the first pass by MMS 224 over binary tree 300, and the associated routing table 410. As illustrated, the node corresponding with the prefix 01* has been added to binary tree 400, with a next hop to "A," the default next-hop.

In the second pass over the routing table, MMS 224 calculates the most prevalent next-hops at every level of the binary tree by percolating sets of next hops up the tree. For a given pair of child nodes, denoted "X" and "Y," the ancestor's next-hop, denoted "X # Y," is determined by evaluating the logical intersection of the sets of next-hops of the pair of child nodes, that is "X ∩ Y." The determination of the ancestor's next hop is determined as:

If X∩Y≠0, then X#Y=X∩Y. [1]

If X∩Y=0, then X#Y=X∪Y. [2]

Figure 5:
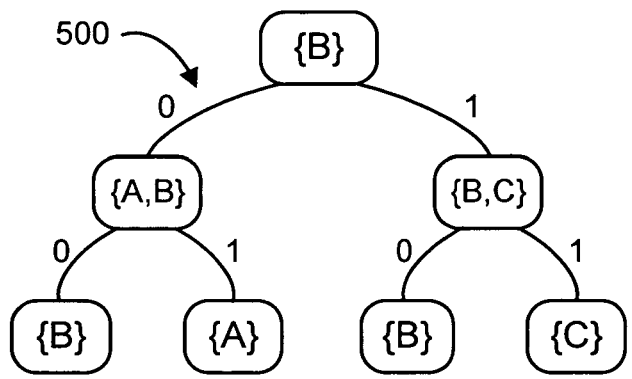
FIG. 5 is the binary tree of FIG. 1 after a second processing pass by an embodiment of a memory management system.

FIG. 5 illustrates the binary tree 500 that results after the second pass by MMS 224 over binary tree 300.

Figure 6:
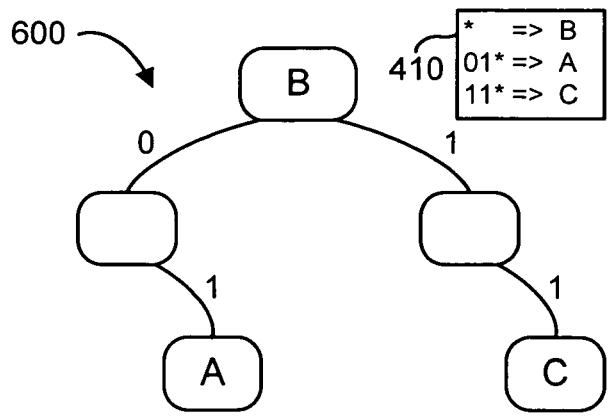
FIG. 6 is the binary tree of FIG. 1 after a third processing pass by an embodiment of a memory management system.

In the third pass over the routing table, MMS 224 selects next hops for the prefixes and eliminates redundant routes by subnetting. Except for the root node, each node will inherit a next-hop from its closest ancestor that has a next-hop. If this inherited next-hop is a member of the node's set of potential next-hops, then the node does not need a next-hop, because it is inheriting an appropriate next-hop from its ancestor. However, if the inherited next-hop is not a member of the node's set of potential next-hops, then the node needs a next hop, and any member of the set of potential next-hops may be chosen. FIG. 6 illustrates the binary tree 600 that results after the third pass by MMS 224 over binary tree 300, and the associated routing table 610. Because the root node in binary tree 500 includes the singleton next-hop set "{B}," B is selected as the next hop for the root node in binary tree 600. Also, because B is a member of the sets of both of the child nodes of the root node, the next-hops are removed from the child nodes of the root node. Further, since two nodes, corresponding to the 00* and the 10* subnets, share the same next hop as the root node, those two nodes are trimmed from the binary tree 600. As illustrated, routing table 610 has a default next hop to "B," IP addresses with the prefix 01* have a next-hop to "A," and IP addresses with the prefix 11* have a next-hop to "C." Routing table 610 is shown to have three entries. Thus routing table 610 maintains the same routing behavior as routing table 301, but with one less entry.

In another embodiment, MMS 224 can take advantage of the fact that the individual routing tables in routers 231, 232, 241, 242, and 243 include many prefixes and next-hops that are in common. For example, a typical BGP decision process includes selecting the prefix:

1. First, with the highest Local Preference (Local_Pref) attribute;
2. Next, with the shortest AS path (AS_path) attribute;
3. Next, with the lowest Origin attribute;
4. Next, with the lowest Multi-Exit Discriminator (MED) attribute;
5. Next, learned from eBGP in favor of learned from iBGP;
6. Next, with the lowest IGP metric; and
7. Finally, with the lowest router identification.

Decisions 1-4 do not change for the routers 231, 232, 341, 242, and 243, but define a set of prefixes that relate to network 210. On the other hand, decisions 5-7 each include router specific considerations. Thus, MMS 224 can first compute a compressed routing table that includes prefixes that all routers 231, 232, 241, 242, and 243 share. For example, MMS 224 can construct a virtual router that receives all routes from routers 231, 232, 241, 242, and 243, and from AS 250, and can compute a compressed routing table for the virtual router. MMS 224 can then compute the router-specific differences for each router 231, 232, 241, 242, and 243. MMS 224 can then direct RCS 223 to update routers 231, 232, 241, 242, and 243 with the resulting routing tables.

In another embodiment, MMS 224 takes advantage of parallel computing algorithms to improve processing efficiency. As such, MMS 224 can maintain a queue of nodes in the binary tree representing the routing tables. When a processing thread becomes available, MMS 224 can select a node from the head of the queue and perform compression on the subtree rooted at the selected node. MMS 224 can also ensure that not all nodes in the subtree are locked during processing so that no other thread can concurrently process nodes in the subtree. In another embodiment, the nodes in the binary tree can be prioritized based upon the number of descendants, and nodes can be selected to partition the binary tree into N approximately equally sized subtrees, where N is the number of threads available.

Note that, with routing protocols such as BGP, RIP, IGRP, OSPF, or IS-IS, the routes to prefixes are computed independently from each other, and so a modification to one route does not necessitate changes to the other routes. This is not true when the routing tables are compressed. With compressed routing tables, a single modification can trigger other routes to coalesce or uncoalesce. Nevertheless, a single modification is unlikely to cause changes to a majority of the routes, even in a compressed routing table. Therefore, running a compression algorithm on the entire table after each route change is an unnecessary waste of processing resources.

In another embodiment, MMS 224 incrementally updates the routing tables, processing the portion of the routing table that is affected by a particular received update. Table 1 illustrates this embodiment with an algorithm for performing incremental updates on a routing table "T" after receipt of an update "U." In a first step, at line 1, a node "N" is created in T. N is assigned the prefix associated with U. If the update type is an announcement, then the N is assigned the same next-hop as U. Otherwise, N is assigned a next hop of "0," that is, "no next-hop." In a next step, at line 9, each descendant "D" of N is evaluated. If D is affected by U, then D is normalized. If D is not affected by U, then the children of D do not need to be further processed, and the next D is evaluated, until all descendants of N are finished. In a next step, at line 17, the set of prevalent next-hops is determined for N and N's children, as described above. In a next step, at line 20, each ancestor "A" of N is evaluated. If A is affected by U, then A is normalized. If A is not affected by U, then the ancestors of A do not need to be further processed, and the next A is evaluated, until all ancestors of N are finished. In a final step, at line 30, each descendant "D" starting from the highest affected descendant is evaluated. If D is affected by U, then a next_hop is selected for D as described above. If D is not affected by U, then the children of D do not need to be further processed, and the next D is evaluated, until all descendants are finished. The computer program listing appendix includes code for implementing an embodiment of the normalization as called for in the algorithm.

TABLE 1

Algorithm for Incremental Updates

1: // Create a node associated with U.prefix.
2: N = create_node_for_prefix(T, U.prefix)
3: if U.type = "announce" then TABLE 1-continued Algorithm for Incremental Updates 4:     N.next.hop = U.next.hop
5: else
6:     N.next.hop = 0 (i.e. "no next-hop")
7: end if
8:
9: // Normalize all affected children of N.
10: for D an element of N.descendants do
11:     changed = Normalize(D)
12:     if !changed then
13:         skip_children_of(D)
14:     end if
15: end for
16:
17: // Recalculate prevalent hop set of N and children.
18: prevalent_hop_calculation(N)
19:
20: // Normalize all affected ancestors of N.
21: highest = N
22: for A an element of N.ancestors do
23:     changed = Normalize(A)
24:     if !changed then
25:         skip_ancestors_of(A)
26:     end if
27:     highest = A
28: end for
29:
30: // Compute new next-hops to use for forwarding
31: for D an element of higest.descendants do
32:     changed = D.select_next_hop( )
33:     if !changed then
34:         skip_children_of(D)
35:     end if
36: end for A = Ancestor,
D = Descendant,
N = Node,
T = Tree,
U = Update In this embodiment, copies of the uncompressed routing tables are maintained by MMS 224 after the operation of the algorithm, so that future incremental updates can be performed. Furthermore, by maintaining the uncompressed routing tables, and overlaying the compressed routing tables on the uncompressed routing tables, the changes can be identified and MMS 224 can direct RCS 223 to update routers 231, 232, 241, 242, and 243 with the changes, rather than with the entire compressed routing tables.

In another embodiment, MMS 224 functions to permit the routing behavior of the compressed routing tables to diverge from the original routing behavior in order to maximize compressibility of the routing tables. As such, MMS 224 determines a small set of routes that, if shifted away from their original forwarding paths, leads to a larger gain in the compressibility of the routing tables. Here, a threshold level in the BGP decision process, described above, is selected. Above the threshold level, MMS 224 processes prefixes normally, resulting in a set of routes for each prefix that are equally good according to the steps of the BGP decision process that are above the threshold level. Next, MMS 224 runs an algorithm similar to the ORTC algorithm, described above, on the set of routes, selecting the route or set of routes that results in a more compressed routing table. The modified ORTC algorithm preferably permits multiple next-hops to reside in each node. Finally, MMS 224 runs the remaining steps of the BGP decision process to determine the route for each prefix. In another embodiment, MMS 224 can create routing tables that diverge from the original routing behavior as a fallback mechanism if the compressed routing table size exceeds the memory capacity of a particular router 231, 232, 241, 242, or 243.

Figure 7:
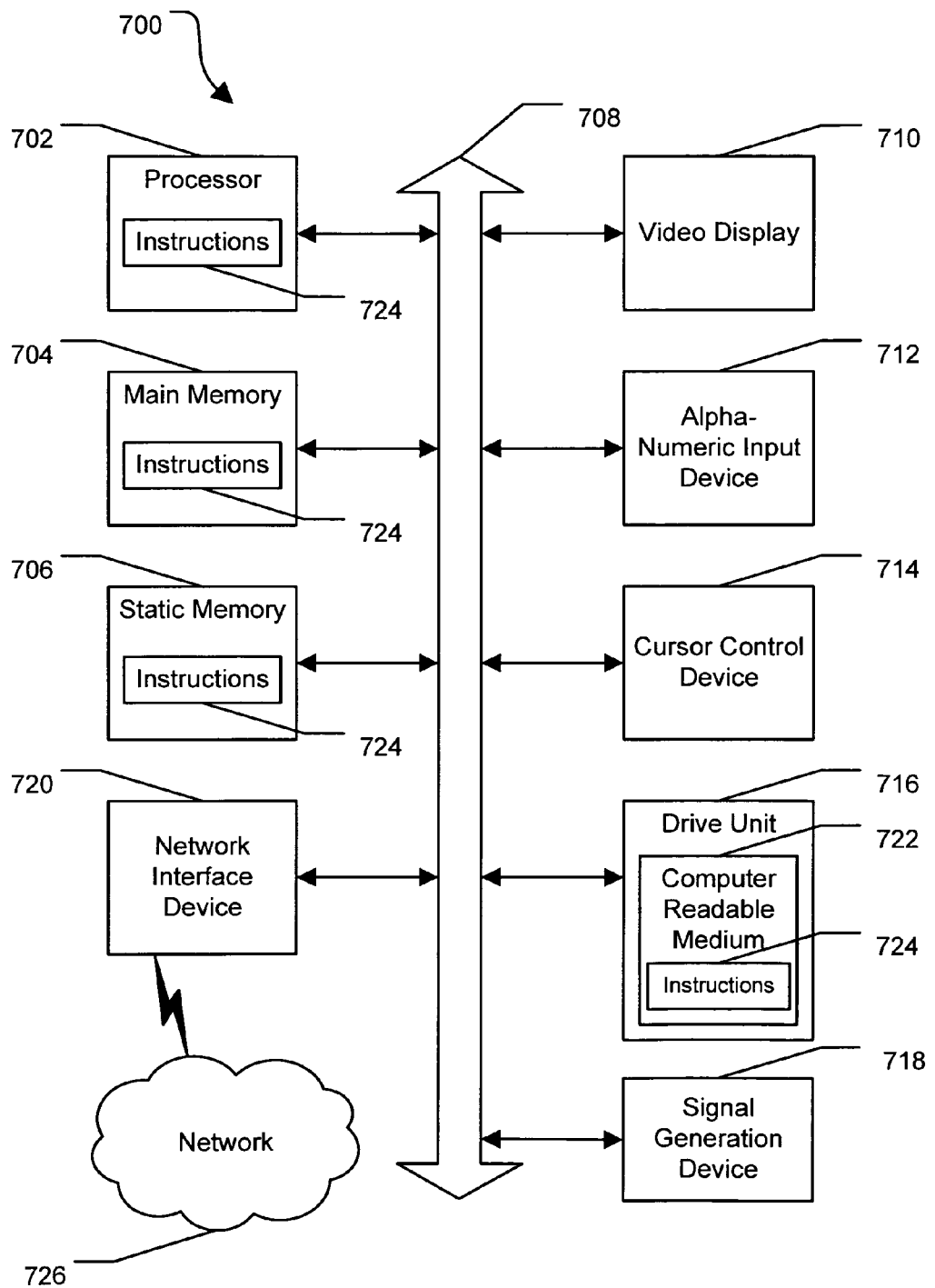
FIG. 7 is a block diagram illustrating an embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A networking device operably couplable to a first router and an autonomous system, the networking, device comprising:
    a gateway operable to:
        receive a first routing table from the first router;
        exchange routing information with the autonomous system; and
        send a first compressed routing table to the first router; and
    a memory management system comprising a processor operable to:
        in response to exchanging routing information, update the first routing table to create a first updated routing table; and
        incrementally coalesce the first updated routing table into the first compressed routing table, wherein, in incrementally coalescing the first updated routing table, the memory management system is further operable to:
            create an update node associated with a prefix received from the updated routing table;
            normalize a child node associated with the update node;
            determine a set of prevalent next-hops for the child node;
            normalize an ancestor node associated with the update node; and
        select a particular next-hop from the set of prevalent next-hops for the ancestor node, the update node, and the child node.

2. The networking device of claim 1, wherein the first compressed routing table causes the first router to forward data in a manner that is identical to the first routing table.

3. The networking device of claim 1, further operably couplable to a second router, wherein:

the gateway is further operable to:
receive a second routing table from the second router; and
send a second compressed routing table to the second router; and
the memory management system is further operable to:
in response to exchanging routing information, update the second routing table to create a second updated routing table; and
coalesce the second updated routing table into the second compressed routing table.

4. The networking device of claim 3, wherein in exchanging information, the gateway is further operable to send the first routing table to the autonomous system.

5. The networking device of claim 4, wherein the gateway uses a border gateway protocol to:
receive the first and second routing tables;
exchange routing information with the autonomous system; and
send the first and second compressed routing tables.

6. The networking device of claim 1, wherein in coalescing the first updated routing table, the memory management system is further operable to:
compute a set of common route information from the first updated routing table;
compute a first set of unique route information from the first updated routing table; and
combine the set of common route information with the first set of unique route information together to form the first compressed routing table.

7. The networking device of claim 1, wherein:
the processor is operable to perform computation on a plurality of processing threads; and
in coalescing the first updated routing table, the memory management system is further operable to:
place a plurality of nodes of the first updated routing table into a queue, wherein the plurality of nodes each relate to a portion of the first updated routing table that is to be updated;
select a first of the plurality of nodes from the head of the queue; and
coalesce a first tree associated with the first of the plurality of nodes into a first compressed tree by computing on a first of the plurality of processing threads.

8. The networking device of claim 7, wherein in coalescing the first updated routing table, the memory management system is further operable to:
select a second of the plurality of nodes from the head of the queue; and
coalesce a second tree associated with the second of the plurality of nodes into a second compressed tree by computing on a second of the plurality of processing threads.

9. The networking device of claim 1, wherein incrementally coalescing the first updated routing table is in response to an update received by the networking device.

10. The networking device of claim 1, wherein the memory management system is further operable to coalesce the first updated routing table into a second compressed routing table, wherein the second compressed routing table:
is smaller than the first compressed routing table; and
causes the first router to forward data in a manner that is different from the first routing table.

11. A method comprising:
receiving a routing table from a router;
receiving routing information from an autonomous system;
updating the routing table with the routing information from the autonomous system;
compressing the updated routing table to eliminate redundant route information by:
creating an update node associated with a prefix received from the updated routing table;
normalizing a child node associated with the update node;
determining a set of prevalent next-hops for the child node;
normalizing an ancestor node associated with the update node; and
selecting a particular next-hop from the set of prevalent next-hops for the ancestor node, the update node, and the child node; and
sending the compressed routing table to the router.

12. The method of claim 11, wherein compressing the updated routing table further comprises:
computing a set of common route information from the routing table;
computing a first set of unique route information from the routing table; and
combining the set of common route information with the set of unique route information together to form the compressed routing table.

13. The method of claim 11, wherein compressing the routing table further comprises:
placing a plurality of nodes of the routing table into a queue, wherein the plurality of nodes each relate to a portion of the routing table that is to be updated;
selecting a first of the plurality of nodes from the head of the queue; and
coalescing a first tree associated with the first of the plurality of nodes into a first compressed tree by computing on a first of the plurality of processing threads in a multi-thread processor.

14. The method of claim 11, wherein compressing the routing table further comprises incrementally making the compressed routing table.

* * * * *